United States Patent Office 3,275,643
Patented Sept. 27, 1966

3,275,643
ALLANTOIN-PANTOTHENATE COMPOUNDS
Irwin I. Lubowe, 667 Madison Ave., New York, N.Y.
No Drawing. Filed July 19, 1963, Ser. No. 296,396
6 Claims. (Cl. 260—299)

This invention relates to new chemical compounds, and more particularly, provides new chemical compounds comprising the salts of calcium pantothenate, pantothenyl alcohol, and pantothenc acid in combination with allantoin compounds selected from the class consisting of allantoin and aluminum salts of allantoin.

The pantothenate compounds are vitamins of the B-complex group essential for growth and normal maintenance of skin and hair. There are clinical reports demonstrating the successful treatment of a variety of skin disorders by the use of topical pantothenyl alcohol. Pantothenic acid is chemically designated as:

D(+)—N—(alpha,gamma-dihydroxy-beta, beta-dimethylbutyryl)-beta,alanine.

The structural formula of pantothenic acid is the following:

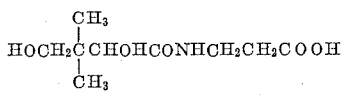

Pantothenic acid is a viscous oil that is unstable, extremely hygroscopic and is readily destroyed by acids, bases, and heat. It decomposes at approximately 90.5° C. It is freely soluble in water, ethyl acetate, and acetic acid; moderately soluble in ether, amyl alcohol and is practically insoluble in benzene and chloroform. The pH of the aqueous solution (1/20) is between 7.2 and 8.0.

Allantoin is a nitrogen-containing compound of the formula

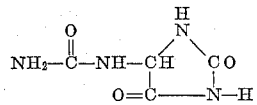

This compound stimulates cell proliferation and tissue growth. Its healing properties are assisted by the fact that is is mildly keratolytic and a protein dispersant: it debrides necrotic and scaly tissue. Moreover, it has been suggested that allantoin has a soothing, pain-relieving action. Certain complex aluminum salts of allantoin have been found to possess the soothing and healing properties of allantoin and the astringent properties of aluminum compounds. These salts are particularly valuable in that they possess this combination of properties without, however, possessing the usual skin irritant characteristics of aluminum salts, or the destructive action of such aluminum salts on fabrics.

While the foregoing compounds comprising the pantothenates, on the one hand, and allantoin and aluminum salts of allantoin, on the other, have separately been used for their respective beneficial properties with some moderate success, they have limiting drawbacks and deficiences, individually. It is difficult to produce stable complexes with pantothenic acid. This is due to the unstable nature of the pantothenic acid itself and, to some extent, of its calcium and sodium salt. Allantoin has limited solubility in water and alcohol. A saturated aqueous solution contains only 0.6% of allantoin. While allantoin is effective in the dry state or in a suspension, this limited solubility is often disadvantageous, as, for example, when it is desired to utilize it for irrigation, to compress to a wound, or for topical applications.

Simple mixtures of allantoin or its aluminum salts with calcium pantothenate, pantothenyl alcohol or pantothenic acid do not overcome these disadvantages. The insolubility of the allantoin compound constitutes a limitation of their use in that manner. Moreover, compatibility limitations are encountered between the pantothenic compounds and the allantoin compounds, whereby mere mixtures of these two classes of materials may result in precipitation of one or the other in certain media.

It is an object of the present invention to provide new chemical compounds to overcome the foregoing disadvantages experienced by the use of discrete single members of the two stated classes of compounds. A particular object of the invention is to provide new chemical compounds which exhibit beneficial properties when applied topically for dermatological or cosmetic purposes, or when used internally in pharmaceutical preparations.

A further object is to provide new chemical compounds comprising salts of pantothenic acid, calcium pantothenate, and pantothenyl alcohol combined with allantoin compounds selected from the classes consisting of allantoin and aluminum salts of allantoin. Said compounds comprise stable complexes that enhance the characteristics of each of the constituents of said compounds.

An additional object is to provide new chemical compounds comprising a combination of pantothenates, such as calcium pantothenate, pantothenyl alcohol and pantothenic acid, with aluminum allantoin complexes which exhibit the advantageous properties and characteristics of each of the several constituents of said compounds without, however, exhibiting those properties which limit the utility of the separate individual components of the salts.

A still further object of the invention is the provision of methods for the preparation of stable compounds which include calcium pantothenate, pantothenyl alcohol and pantothenic acid, on the one hand, and allantoin and aluminum salts of allantoin, on the other.

These and other objects will become evident from a consideration of the following specification and claims:

The novel compounds of the present invention are salts of a physiologically utilizable vitamin of the pantothenate family combined chemically with an allantoin compound selected from the class consisting of allantoin and complex aluminum salts of allantoin.

It has been found that allantoin, or complex aluminum salts of allantoin, can be combined with compounds of the pantothenate class, to form novel compounds which are salts of the pantothenate compound with the allantoin compound, and which have properties which neither of the components exhibit separately or in simple admixtures of one with the other. The solubilities of the novel salts of the present invention are considerably greater than would be expected from the solubilities of the individual or separate components entering into the formation of the salts. This enhanced solubility renders the new compounds more suitable for topical and dermatological applications where water solubility is required or desired, as in the preparation of water solutions for irrigation, application as compresses, or the like.

These new salts do not present the incompatibility problems of mere mixtures of the two components where solutions thereof are desired to be used. Physiologically, the components in the compounded form exhibit a synergistic action. On the one hand, the pantothenate component promotes epithelization of the skin and acts as a healing agent when topically applied thereto. It has been recognized that the pantothenates, being vitamins of the B-complex group, are essential for growth and normal maintenance of the skin and hair, a deficiency of said vitamins being manifested by development of lesions of the skin or hair. On the other hand, the allantoin component of the new compound cooperates with the pantothenate component by stimulating normal cell and tissue formation. At the same time it produces a keratolytic action in cleansing away undesirable necrotic or scaly tissue.

Those novel salts of the present invention which also contain aluminum manifest the astringent action of aluminum without exhibiting the irritant characteristics of aluminum salts in general. Moreover, the salts of the present invention are more substantive to the skin than the pantothenate compounds themselves, or a mixture thereof with the allantoin compounds, thus producing a more prolonged action.

The sustained action is due to the slow release from the complex of the constituent components when subjected to the natural moisture of the tissues to which the complex is applied. This sustained action is attributable to the greater solubility of the compound as compared with that of the separate components in a simple mixture where the action of the latter would be transient. With a simple mixture, rapid chemical exhaustion of the individual components takes place. With the new compounds of the present invention, chemical exhaustion is considerably slower, thereby prolonging the effectiveness of the material at the situs of application.

A striking feature of the new compounds herein is their greatly increased solubility as compared with the respective solubilities of the individual components, as well as of an ordinary uncompounded mixture thereof. The increase in solubility for the various new compounds ranges from approximately 40% to 200%. This increase in solubility, which is achieved by the new compounds herein, enhances the effects of the separate constituents in time and intensity in whatever physiological or topical contexts the compounds are utilized.

Another salient feature exhibited by the new compounds herein is the considerably increased stability, particularly of the pantothenate constituents, the latter being somewhat unstable as separate compounds. By compounding the allantoin or aluminum salt of allantoin with the pantothenates, an enhanced stability for the pantothenate constituent is realized, thereby enhancing and prolonging the effectiveness of the pantothenate action in whatever context it may be utilized. Accordingly, the new compounds described and claimed herein exhibit characteristics which are greatly superior to those that are implicit in the separate respective constituents.

The preparation of the salts of the present invention is effected by contacting the selected allantoin compound with the selected pantothenate compound in a mutual solvent. The allantoin constituent and the pantothenate consituent may be combined in ratios that provide substantially molar equivalents of each, but this is not critical, and the ratios may vary considerably. The solvent in which they interact will usually be water or at least a reaction medium containing water, such as an aqueous alcoholic solution. The reaction medium need comprise only a sufficient amount of solvent to permit salt formation to occur.

For example, one procedure which has been found to be particularly suitable in preparing the salts of this invention is to combine the allantoin compound and the pantothenate compound in a dry, finely-divided condition. Hot water—in some cases at temperatures up to its boiling point—is then added to the mixture with constant trituration. The entire reaction mixture solidifies and the solid product can then be broken up and dried by suitable means including vacuum techniques to provide a powder comprising a salt as provided by this invention.

The reaction involved in the formation of the salts of the present invention generally requires exposure to somewhat elevated temperatures, at least momentarily, in order to be completed in a reasonable time. Moderately elevated temperatures, up to the boiling point of water, for example, are preferred. To avoid decomposition of allantoin or its salts and of the pantothenate compounds, higher temperatures are avoided. If desired, however, reaction temperatures down to room temperatures or below may also be employed.

On completion of the reaction, when the product is to be separated from a reaction medium in which it has been prepared, isolation of the product is preferably effected by means such as evaporation of the solvents under vacuum, or by other methods known to those skilled in the art which similarly avoid exposure of the product to excessively high temperatures.

The products of the present invention find many uses in the medical and cosmetic fields. The products may be made up in the form of semi-solid compositions such as lotions, creams, gels, or the like. Solid compositions, including talcum powders and the line, aerosol powders, and tablets which may be diluted with water or saline solution to make soothing and anti-inflammatory compresses or soaks can also be prepared. The present salts are very stable when introduced into aqueous or alcoholic solutions, and the stability can be maintained over prolonged periods of time by addition of small amounts, such as from 0.1% to 2%, of calcium, sodium or potassium acid phosphate salts or quaternary amines. In preparing medicinal or cosmetic compositions, the salts of the present invention may be formulated with conventional pharmaceutical or cosmetic carrier media. The salts may also combine with other active pharmaceuticals and the like, such as aluminum acetate or magnesium sulfate, quaternary amines, hormones, vitamins, anti-perspirants, and so forth, to increase the effectiveness of both the new chemical compounds and the materials with which they are combined.

The products of the invention may be used in deodorant, anti-perspirant or hemostatic compositions and compositions for the treatment of various dermatological irritations, for internal remedies such as in the treatment of gastric-peptic ulcers, and in other applications where the healing and soothing properties of the products can be utilized.

The preparation of the products of the present invention will be more readily understood from a consideration of the following specific examples which are given for the purpose of illustration only and are not intended to limit the scope of the invention in any way.

One useful compound which is successfully compounded to form a double salt end product is allantoin calcium pantothenate having the following structural formula:

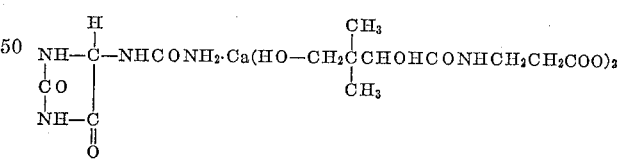

The foregoing compound may be prepared by any of the following procedures:

(1) 16 grams of allantoin (200 mesh) trituration are mixed thoroughly with 50 grams of calcium pantothenate and 3½ cc. of boiling distilled water is added immediately thereto, the mass being mixed thoroughly for a period of from 5 to 10 minutes. Thereafter, the mass is spread out on a suitable surface and dried at about 50° to 60° C. The relative proportions of the constituents of the resulting compound are:

| | Percent |
|---|---|
| Allantoin | 25±5 |
| Calcium pantothenate | 75±5 |

The solubility of the mix, in the same proportion, prior to compounding, is 1.5%. The solubility of the resulting end compound, however, is 2.5% to 3% in water.

(2) The same procedure as outlined in paragraph 1 is followed with the exception that, for the solvent, 4 cc. of alcohol is substituted for the boiling distilled water. The relative proportions of the constituents of the resulting compound are:

| | Percent |
|---|---|
| Allantoin | 25±5 |
| Calcium pantothenate | 75±5 |

The solubility of the mix, in the same proportion, prior to compounding, is 1.5%. The solubility of the resulting end compound, however, is 2.5% to 3% in water.

(3) The same procedure as outlined in paragraph 1 is followed with the exception that, for the solvent, 8 cc. of cold water is used and the resulting paste mass is dried for a period of approximately three days at from about 50° to 60° C. This results in the formation of a hard mass which may then be comminuted into a powder which contains 2 to 4 molecules of water of crystallization. The relative proportions of the constituents of the resulting compound are:

| | Percent |
|---|---|
| Allantoin | 18±2 |
| Calcium pantothenate | 55±2 |

The solubility of the resulting end compound is 4.5% in water.

(4) The same procedure as outlined in paragraph 3 is followed with the exception that, for the solvent, 8 cc. of alcohol is used. In this case the resultant product contains no water of crystallization. The relative proportions of the constituents of the resulting compound are:

| | Percent |
|---|---|
| Allantoin | 25±5 |
| Calcium pantothenate | 75±5 |

The solubility of the mix, in the same proportion, prior to compounding, is 1.5%. The solubility of the resulting end compound is 2.5% to 3% in water.

The following is a tabulation of the melting points of the foregoing substances:

| | ° C. with decomposition |
|---|---|
| The allantoin calcium pantothenate mixtures, in the same proportion, prior to compounding | 196 to 230 |
| The new compounds of the present invention | 243 to 247 |
| Allantoin | 228 to 236 |
| Calcium pantothenate | 196 to 198 |

The pH of the foregoing substances are as follows:

| | |
|---|---|
| pH of 1% solution of the new compounds | 6.8 to 7 |
| pH of 1% solution of allantoin calcium pantothenate mixture, in the same proportion, prior to compounding | 7.7 to 7.9 |
| pH of 1% solution of calcium pantohenate | 9.4 |
| pH of 1% solution of allantoin | 6.0 |

It appears from both the foregoing melting points and the pH characteristics that the new compound, allantoin calcium pantothenate, has a high degree of stability and that its pH is fairly close to neutral, both of these characteristics being superior for many purposes than manifested by the respective melting points and of the pH of the individual ingredients.

When it is desired to form allantoin pantothenates with pantothenic acid, rather than with calcium pantothenate, it has been found that the later, being somewhat unstable, does not complex with allantoin or form its true calcium or aluminum salts.

In order to achieve the objectives of forming the compounds described and claimed herein, it was found that this is possible by using pantothenic acid in a freshly prepared condition when it is complexed with allantoin or its salts. The technique utilized is to prepare a saturated aqueous solution of the pantothenic acid or of its calcium or sodium salts which is used to prepare the various compounds. After the compounding is compounding is completed, the final mix is dried at low temperature or under vacuum.

Such "fresh pantothenic acid" may be prepared as follows:

(a) By the condensation of β-alanine with the optically resolved form of the lactone of pantoic acid (pantolactone).
(b) By passing $CO_2$ into a saturated solution of calcium pantothenate until all of the calcium is precipitated out.
(c) By treating a saturated solution of calcium pantothenate with a solution of oxalic acid which will precipitate the calcium and leave the pantothenic acid in solution.

By using freshly prepared pantothenic acid, it is possible to form the compound, allantoin pantothenic acid, which has the following formula:

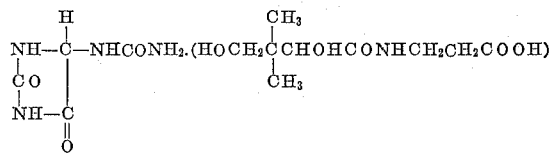

The foregoing compound is formed by combining the the freshly prepared pantothenic acid with allantoin (in equimolecular quantities) by thorough trituration with the resulting mass being dried at between about 50° to 60° C.

Another useful compound is aluminum chlorhydroxy allantoin pantothenate which has the following formula:

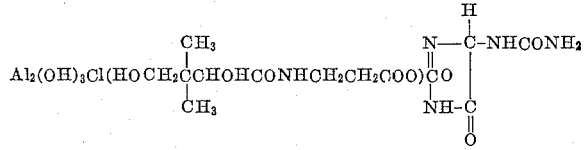

The foregoing compound may be made by mixing 21 grams of freshly prepared pantothenic acid thoroughly with 40 grams of aluminum chlorhydroxy allantoin, the resulting product being dried at about 50° to 60° C.

A further useful compound comprises aluminum hydroxy allantoin pantothenate having the following formula:

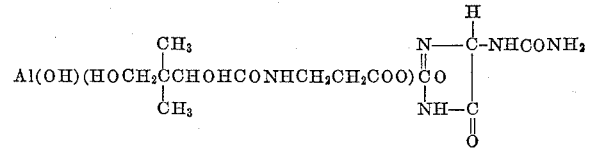

This compound may be made by mixing 30 grams of aluminum hydroxy allantoin thoroughly with 21 grams of freshly prepared pantothenic acid, the resulting product being dried at about 50° to 60° C.

Still another useful compound comprises a true salt of calcium allantoin pantothenate having the following formula:

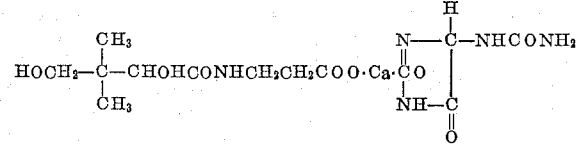

A satisfactory process for making the foregoing compound is as follows:

One M.W. allantoin is dissolved in a warm (60° C.) concentrated solution containing one M.W. pantothenic acid. One M.W. calcium carbonate is added slowly to this solution wherein all of the ingredients are thoroughly mixed. Thereafter, the slurry is evaporated under vacuum at about 40° to 50° C. to approximately one-third of its original volume, and thereafter subjected to a temperature of minus 10° C. for several hours, after which the crystallized material is removed at the low temperature. The crystals are then washed first with cold alcohol and then with ether.

In all of the procedures for preparing the various compounds described hereinbefore, the proportions of the reagents and the temperature ranges for their reactions have been given as guiding examples and it is contemplated that suitable variations in the quantities and in the temperatures may be made in accordance with the experience of those skilled in the art without departing from the intent and scope of the present invention.

What is claimed is:
1. Allantoin pantothenate.
2. Allantoin aluminum pantothenate.
3. Allantoin calcium pantothenate.
4. Aluminum chlorhydroxy allantoinate pantothenate.
5. Aluminum hydroxy allantoinate pantothenate.
6. Calcium pantothenate allantoinate.

References Cited by the Examiner

UNITED STATES PATENTS

| | | | |
|---|---|---|---|
| 2,323,193 | 6/1943 | Boie et al. | 260—311 |
| 2,891,070 | 6/1959 | Ledrut | 260—311 |
| 3,107,252 | 10/1963 | Lubowe | 260—309.5 |

FOREIGN PATENTS

| | | |
|---|---|---|
| 879,259 | 10/1961 | Great Britain. |
| 889,101 | 2/1962 | Great Britain. |

WALTER A. MODANCE, *Primary Examiner.*

NICHOLAS S. RIZZO, *Examiner.*

N. TROUSOF, *Assistant Examiner.*